B. M. BESKOW.
MOTOR TRUCK.
APPLICATION FILED JULY 7, 1908.
1,124,275. Patented Jan. 12, 1915.
5 SHEETS—SHEET 4.
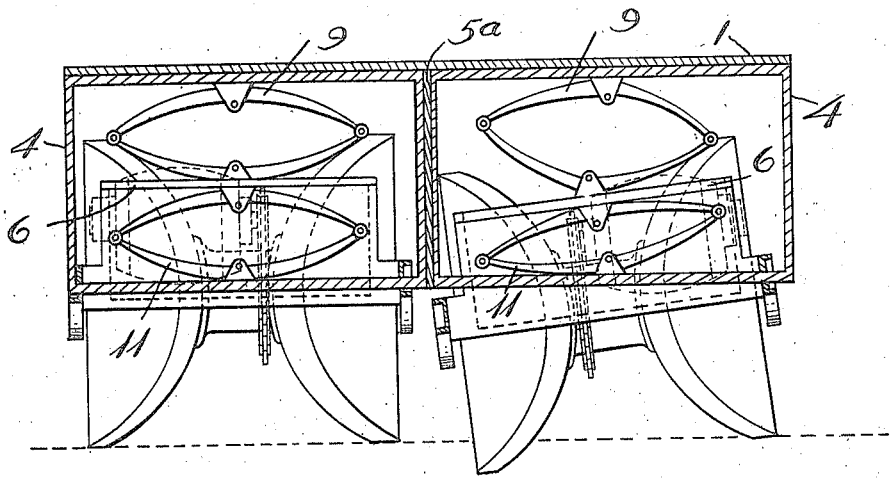
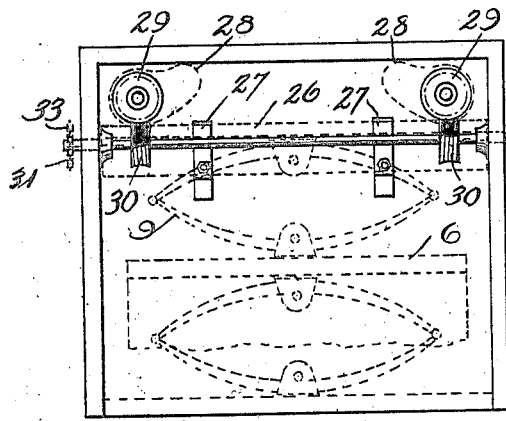
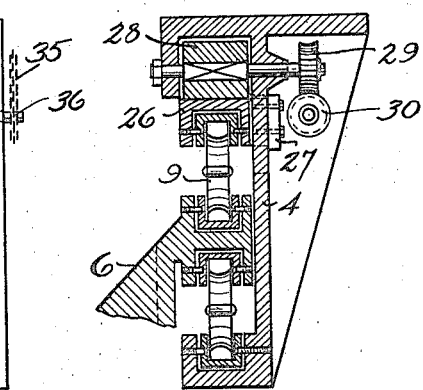

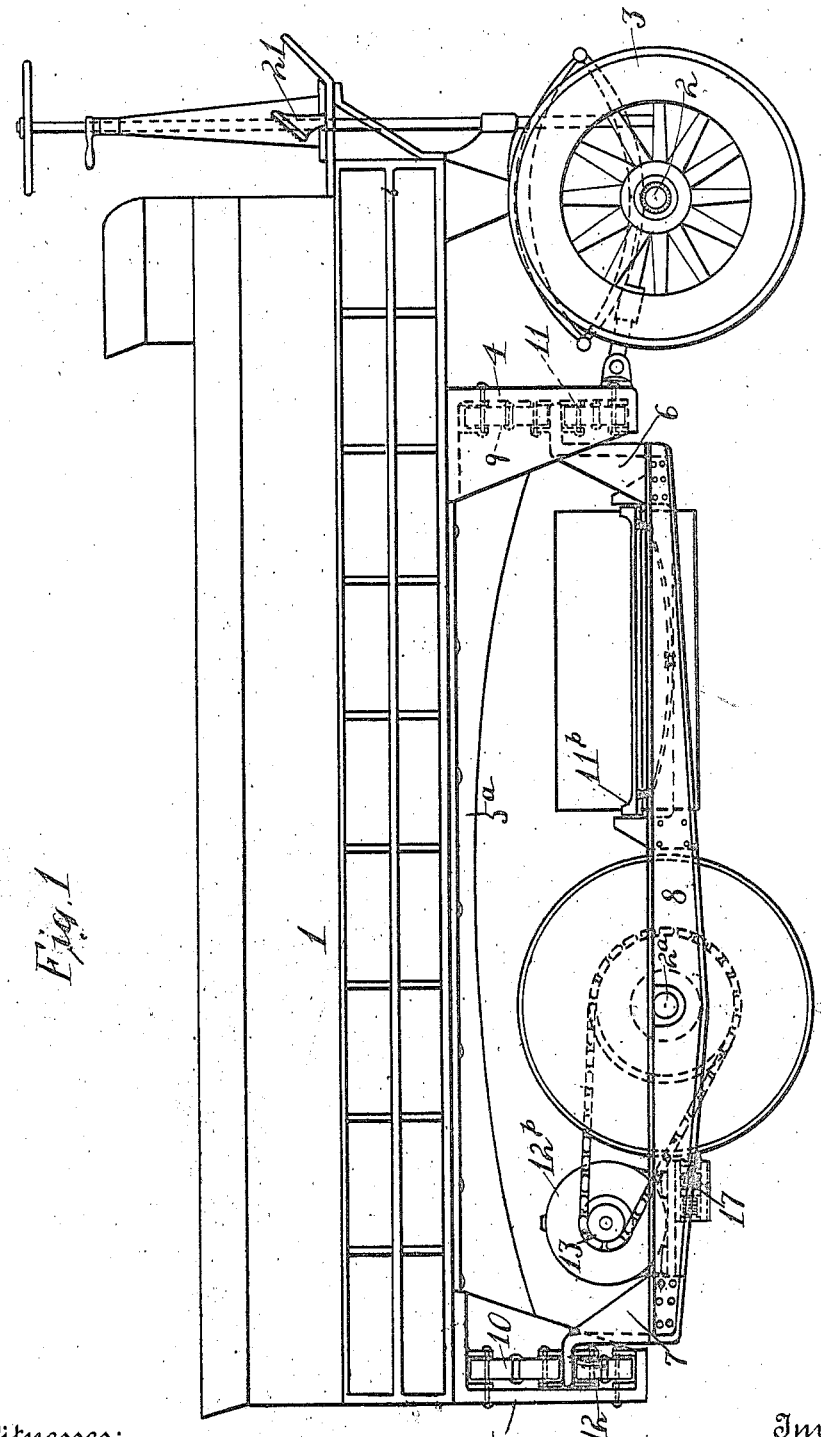

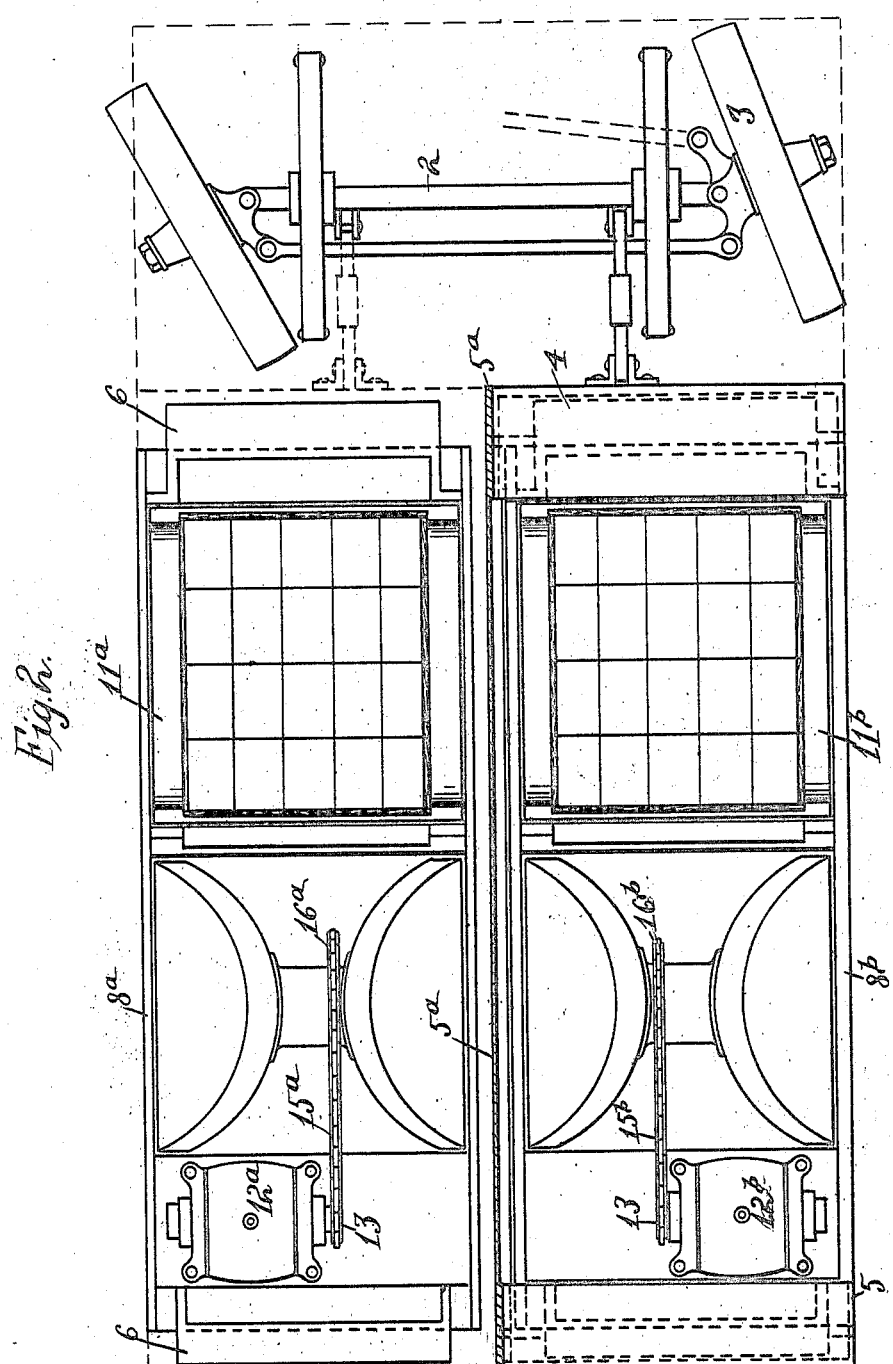

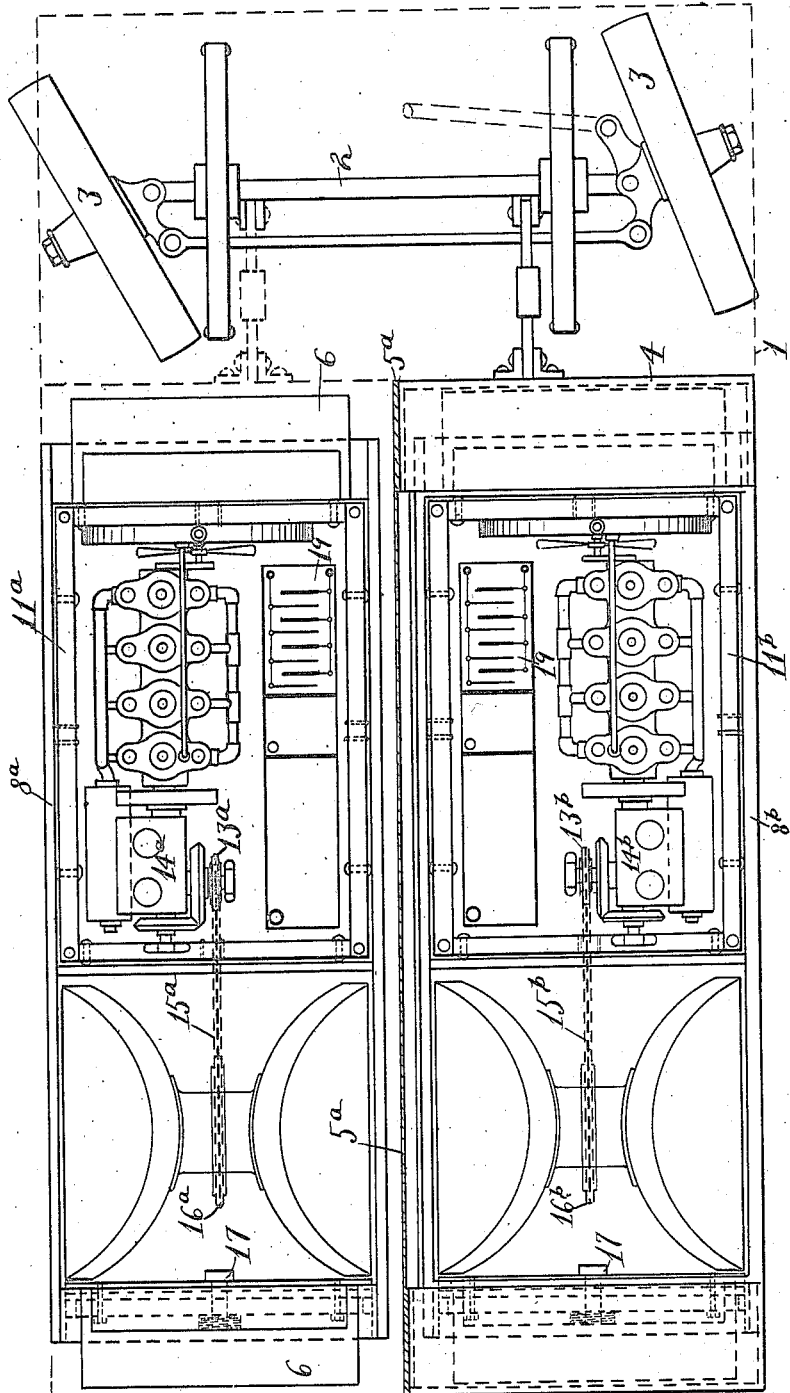

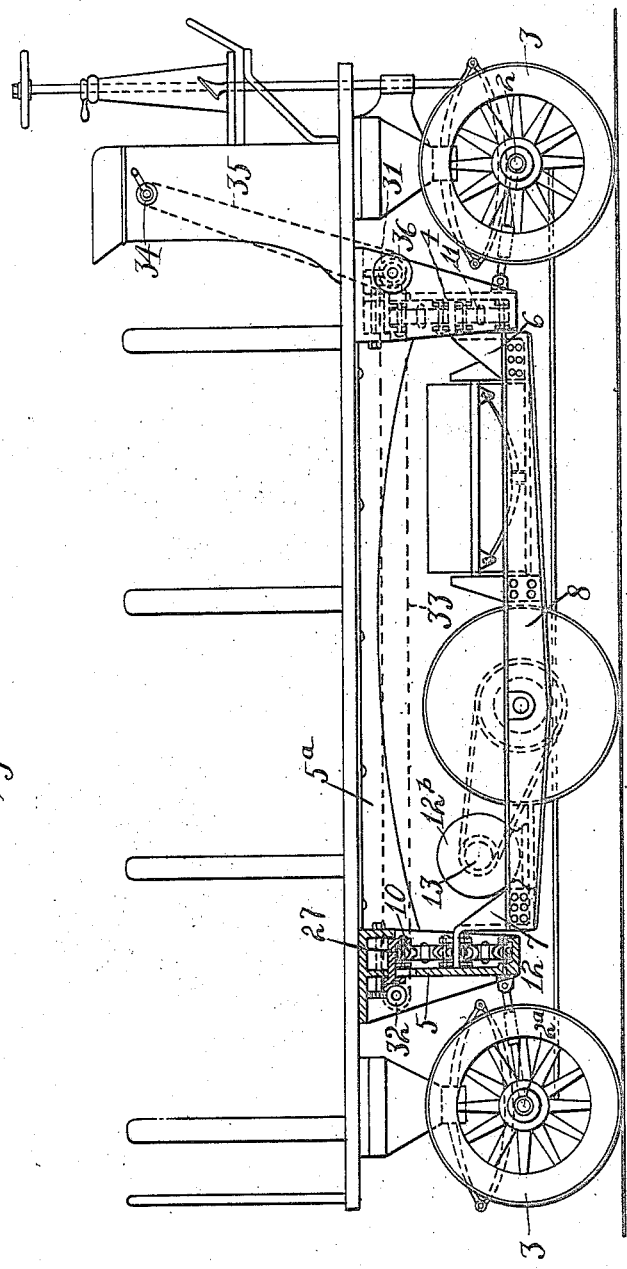

UNITED STATES PATENT OFFICE.

BERNHARD MONTGOMERY BESKOW, OF NEW YORK, N. Y., ASSIGNOR TO COMMERCIAL TRACTOR COMPANY, A CORPORATION OF NEW YORK.

MOTOR-TRUCK.

1,124,275.  Specification of Letters Patent.  Patented Jan. 12, 1915.

Application filed July 7, 1908. Serial No. 442,407.

*To all whom it may concern:*

Be it known that I, BERNHARD MONTGOMERY BESKOW, a citizen of the United States residing at New York, N. Y., have invented certain new and useful Improvements in Motor-Trucks, of which the following is a specification.

My invention relates to improvements in motor vehicles, and is more particularly designed for use in connection with heavy trucks and drays, where great tractive effect is necessary.

In connection with vehicles of this character, it is extremely desirable when traveling with heavy loads to provide some means, whereby the dead load of storage batteries, motors and accessories, is supported free from the body proper of said truck; but it is also necessary that a certain amount of the live load can if necessary be placed over the driving wheels so as to give an increased adhesion between said wheels and the ground.

One object with my invention is to provide an independent tractor in elastic connection with the body of the truck.

Another object is to enable the driver of the truck to increase the load over the driving wheels to such an extent as he considers necessary so as to prevent slipping in going up hill and to reduce the weight over the same wheels when speeding on level road.

Another object is to provide a construction, whereby the bodies of the present horse driven trucks and drays may be utilized if so desired.

My present invention is designed to secure these objects and to this end it includes the novel features of construction hereinafter described and particularly pointed out in the appended claims.

A motor truck constructed in accordance with my invention is illustrated in the accompanying drawings, in which:—

Figure 1 is a side elevation of an electrically operated truck. Fig. 2 is a bottom plan view of the same. Fig. 3 is a bottom plan view of a truck driven by gasolene motor. Fig. 4 is a partly sectional rear view of a truck body with the tractor showing the absolute flexibility between the two frames and the position of them and of the driving wheels, when the truck is traveling over very uneven ground. Fig. 5 and Fig. 6 are details of the traction varying device. Fig. 7 is a side elevation of a dray with both front and rear steering wheels and with the tractor placed between them.

Referring by reference characters to the drawings, the numeral 1 designates the body, and 2 and $2^a$ the front and rear axles respectively, to the ends of either or of both of which, the steering wheels (3) are connected by the usual knuckles operated in the manner well understood by those skilled in the art.

The body (1), carries depending guides 4 and 5, at the front and the rear portions, respectively, which guides are connected together by means of a steel plate $5^a$, distributing the strain, due to the pushing effect of the tractor, evenly on both guides, within which travel the brackets 6 and 7, located at the front and rear ends of the frame 8 of the tractor.

Between the brackets and the upper portions of the guides are located the upper springs 9 and 10 at the front and rear respectively, while between the brackets and the lower ends of the guides are similar springs 11 and 12. By this arrangement an elastic connection is secured between the front and rear ends of the frame of the tractor and the body of the vehicle. The storage battery or the gasolene motor and accessories are carried at one end of the tractor frame and preferably upon independent frames, supported from the frame of the tractor, and each tractor frame is supplied with its own driving wheel or wheels. In carrying out this arrangement, I provide two tractors with frames designated as $8^a$, $8^b$, respectively, and sub-frames $11^a$ and $11^b$, for storage batteries or gasolene motors and accessories upon the front portions of the frames $8^a$, and $8^b$, respectively. For electrically driven trucks I would locate the motors $12^a$ and $12^b$, at the rear of the tractor.

From pinions 13 on said motors or from the pinions $13^a$, and $13^b$, on the gear cases $14^a$, and $14^b$, extend chains $15^a$, and $15^b$, to the sprockets $16^a$, and $16^b$, on the driving wheels, which may be common traction engine wheels or chain wheels or wheels of any other suitable construction.

I prefer to provide two driving wheels, for each motor shaft, having laterally sinuous rims or tires, as by the use of such peripheries, I avoid all danger of slipping of the wheels.

To increase the adhesion between the wheels of the tractor, as shown in Fig. 7, and the ground, the upper springs 9 and 10 at the front and rear respectively, are located on movable platforms 26, Fig. 5 and Fig. 6, which platforms can slide up or down on guide-bars (27) within the guides 4 and 5. The amount of the vertical motion of the platforms is controlled by spiral cams (28) in connection with gear wheels (29) and screws (30), which screws are driven by sprockets 31 and 32 and chain (33). The screws and gear-wheels on the opposite side of the tractor or tractors are all operated simultaneously by turning the hand wheel 34 at the side of the driver. The connection between this wheel and the screw shaft may be by shaft and bevel gear drive or by chain 35 and sprocket 36. When the eccentric parts of the cams (28) are forced downward by turning the hand wheel in one direction, the upper springs 9 and 10 are compressed, reducing the strain on the springs on the front and rear steering-wheels to a certain extent and throwing an additional load on the driving wheels of the respective tractors. Should the upper and lower arms of the springs (9) be brought into contact with each other, the entire load would be practically carried on the tractors and the maximum adhesion reached.

Having thus described my invention, what I claim is:—

1. In a motor vehicle, the combination of a body, and steering wheels connected therewith, of a motor-supporting frame separate from the body and the steering wheels, springs for yieldingly connecting the body and the motor-supporting frame, pivotal connections coöperating with said springs and positioned for the motor-supporting frame to turn on a horizontal axis extending lengthwise of the vehicle, a traction wheel separate from the yielding connections and positioned intermediate the ends of said motor-carrying frame, the axle of said traction wheel being supported in said frame, and a power plant including a motor and driving connections with the traction wheel, both the power plant and the traction wheel being supported in normal operative relation to each other by the motor-carrying frame.

2. In a motor vehicle, a body, spring mechanism positioned below the body, and a motor-supporting frame connected with said spring mechanism by horizontal pivots extending lengthwise with respect to the body and permitting said motor-supporting frame to rock or turn in sidewise directions, in combination with a traction wheel supported in the motor-carrying frame intermediate the ends thereof, and a power plant including a motor, and driving connections with said traction wheel, said power plant and the traction wheel being supported in normal operative relation to each other by said motor-carrying frame.

3. In a motor vehicle, the combination of a body, a plurality of separate frames positioned side by side and below said body, means for connecting said frames yieldably with said body, said yieldable connections for one frame being independent of the similar connections for the other frame, traction wheels supported in the respective frames, and means for driving the traction wheels, each traction wheel and the driving means therefor being movable with the frame in which the traction wheel is mounted independently of the movement of the other traction wheel and driving means supported by the other frame.

4. In a motor vehicle, the combination of a body, a plurality of separate frames positioned side by side with relation to each other and below said body, means for yieldably connecting each frame with the body, the yieldable connections for one frame being independent of the similar connections for the other frame, traction wheels separate from the yieldable connections, each traction wheel having its axle supported in one of said frames, and means for driving said traction wheels, the traction wheel and the driving means therefor being movable with one of said frames independently of the movement with the other frame of the traction wheel and driving means carried by said latter frame.

5. In a motor vehicle, the combination with the body and steering wheels connected with said body, of a motor supporting frame independent of the body and the steering wheels, elastic connections between the respective end portions of said frame and the body, said motor-supporting frame being connected by horizontal pivots with the elastic connections so as to be free to rock or turn on a horizontal axis extending lengthwise of the vehicle, traction wheels the axles of which are journaled in said motor-supporting frame, motive power means carried by the motor-supporting frame, said motive power means operating to impart motion to said traction wheels, and means coöperating with each of said elastic connections for varying the tension thereof, whereby the tractive effect of the traction wheels may be increased or decreased.

6. In a motor vehicle, the combination with the body and steering wheels connected with said body, of guides depending from said body, a motor-supporting frame independent of the body and the steering wheels, said motor-supporting frame having horizontally positioned pivots at the front and rear in slidable engagement with said guides, springs carried by the guides above and below said engaging parts, traction wheels the axles of which are journaled in said motor supporting frame, a motor for supplying power, said motor being carried by the motor-supporting frame and having driving connections with the traction wheels, and means coöperating with each of said springs for varying the tension thereof.

7. In a motor vehicle, a body, a front axle, steering wheels, a motor-carrying frame separate from the body and the steering wheels, means intermediate said frame and the body for securing a sliding and pivotal movement of said frame relative to the body, said motor-carrying frame being free to rock or turn sidewise on a horizontal axis afforded by said pivotal connecting means, spring mechanism for elastically supporting said frame, traction wheels the axles of which are mounted in the motor-carrying frame, whereby said traction wheels are free to move with the motor-carrying frame relative to the body, and a motor supported by the motor-carrying frame for operating said wheels.

8. In a motor vehicle, the combination of a body, a motor-carrying frame, means for yieldably connecting the motor-carrying frame at its respective ends with said body, the motor-carrying frame being free to turn on an axis extending lengthwise of said frame whereby the frame is adapted to tilt or turn in a sidewise direction with relation to the body, a traction wheel the axle of which is supported in the motor-carrying frame, a motor carried by said frame, and a driving connection between the motor and the traction wheel, said motor and traction wheel being both supported upon the motor-carrying frame.

9. In a motor vehicle, a body, a plurality of separate frames extending side by side, one frame being movable relative to said body independently of the other frame, means for pivotally and slidably connecting each of said frames with the body, separate spring mechanisms for elastically supporting said separate frames, traction wheels the axles of which are mounted in the respective frames, whereby the traction wheels are movable with said frames relative to the body, and power mechanism for driving said traction wheels.

10. In a motor vehicle, a body, a plurality of separate frames extending side by side and positioned below the body, each frame being movable on an axis extending lengthwise of the vehicle and free to change its relation to the body independently of the other frame, means for yieldably connecting each frame to the body, the yieldable connections of one frame being independent of those of the other frame, traction wheels the axles of which are supported in the separate frames whereby the traction wheels are movable independently of each other and in all directions with said separate frames, and means for driving the traction wheels.

11. In a motor vehicle, a body, a plurality of separate frames extending side by side and positioned below the body, each frame being movable on an axis extending lengthwise of the vehicle and free to change its relation to the body independently of the other frame, means for yieldably connecting each frame to the body, the yieldable connections of one frame being independent of those of the other frame, traction wheels the axles of which are supported in the separate frames whereby the traction wheels are movable independently of each other and in all directions with said separate frames, said traction wheels being positioned intermediate the ends of the frames, and a motor carried by each frame and connected operatively with one of said traction wheels.

In testimony whereof, I affix my signature in presence of two witnesses.

BERNHARD MONTGOMERY BESKOW.

Witnesses:
   ISABEL LEVINSON,
   SADIE MELLANE.